United States Patent
Yang

(10) Patent No.: US 8,568,265 B2
(45) Date of Patent: *Oct. 29, 2013

(54) CLUTCH FUNCTION DEVICE STRUCTURED WITH CONTROLLABLE EPICYCLE GEAR SET

(76) Inventor: Tai-Her Yang, Dzan-Hwa (TW)

(*) Notice: Subject to any disclaimer, the term of this patent is extended or adjusted under 35 U.S.C. 154(b) by 0 days.

This patent is subject to a terminal disclaimer.

(21) Appl. No.: 13/033,744

(22) Filed: Feb. 24, 2011

(65) Prior Publication Data

US 2012/0220404 A1 Aug. 30, 2012

(51) Int. Cl.
*F16H 15/48* (2006.01)
(52) U.S. Cl.
USPC .......................................... 475/187; 475/230
(58) Field of Classification Search
USPC .......... 475/220, 230, 231, 280, 184, 187, 271
See application file for complete search history.

(56) References Cited

U.S. PATENT DOCUMENTS

| | | | | |
|---|---|---|---|---|
| 6,120,407 A * | 9/2000 | Mimura | ......................... | 475/225 |
| 7,080,707 B2 * | 7/2006 | Kirkwood | ..................... | 180/245 |
| 7,338,404 B2 * | 3/2008 | Gassmann et al. | ............ | 475/231 |
| 2007/0225109 A1 * | 9/2007 | Jang | ............................... | 475/280 |
| 2007/0275807 A1 * | 11/2007 | Bucknor et al. | .................. | 475/5 |
| 2008/0064557 A1 * | 3/2008 | Foeller et al. | .................. | 475/280 |
| 2012/0220410 A1 * | 8/2012 | Yang | ............................. | 475/151 |

* cited by examiner

*Primary Examiner* — Justin Holmes
(74) *Attorney, Agent, or Firm* — Bacon & Thomas, PLLC

(57) ABSTRACT

The present invention relates to a clutch function device structured with a controllable epicycle gear set (EG101), which is driven by a rotary kinetic energy source and combined with a controllable brake device; through controlling the controllable brake device to perform brake locking or releasing, the operations of transmission function of combining transmission or releasing between a rotation shaft (S101) at an output/input end, a rotation shaft (S102) at an output/input end and a sleeve type rotation shaft (AS101) of the epicycle gear set (EG101) are enabled to be controlled.

14 Claims, 2 Drawing Sheets

CLUTCH FUNCTION DEVICE STRUCTURED WITH CONTROLLABLE EPICYCLE GEAR SET

BACKGROUND OF THE INVENTION (a) Field of the Invention

The present invention relates to a clutch function device structured with a controllable epicycle gear set (EG101), which is driven by a rotary kinetic energy source and combined with a controllable brake device; through controlling the controllable brake device to perform brake locking or releasing, the operations of transmission function of combining transmission or releasing between a rotation shaft (S101) at an output/input end, a rotation shaft (S102) at an output/input end and a sleeve type rotation shaft (AS101) of the epicycle gear set (EG101) are enabled to be controlled.

(b) Description of the Prior Art

Conventionally a friction type electromagnetic clutch device is often installed between the output/input end of a rotary kinetic energy source and a load; and through electrically charging or breaking the friction type electromagnetic clutch device to perform operations of combining or releasing, the rotary kinetic energy source and the load are enabled to be engaged or released. One primary disadvantage of the conventional arts is that the friction type electromagnetic clutch device is often remained with residual rotary torque during the releasing, which may cause the kinetic energy loss and the ineffective operation.

SUMMARY OF THE INVENTION

The present invention provides a clutch function device structured with a controllable epicycle gear set, wherein a rotation shaft (S101) combined with an input wheel (W101) of an epicycle gear set (EG101) is served as an output/input end, and a rotation shaft (S102) combined with an output wheel (W102) is served as an output/input end, and a rocker arm (A101) and a sleeve type rotation shaft (AS101) linked by the epicycle wheels (W103) are served as an output/input end, so that a part or all of the three output/input ends are respectively combined to one action side of a corresponding controllable brake device, and the other action side of the controllable brake device is connected to a housing (H100); through controlling the controllable brake device to perform brake locking or releasing, the operations of transmission function of combining transmission or releasing between the rotation shaft (S101) at the output/input end, the rotation shaft (S102) at the output/input end and the sleeve type rotation shaft (AS101) of the epicycle gear set (EG101) are enabled to be controlled.

DESCRIPTION OF MAIN COMPONENT SYMBOLS

A101: Rocker arm
AS101: Sleeve type rotation shaft
BK101-BK102-BK103: Controllable brake device
EG101: Epicycle gear set
H100: Housing
S101-S102: Rotation shaft
W101: Input wheel
W102: Output wheel
W103: Epicycle wheel

DETAILED DESCRIPTION OF THE PREFERRED EMBODIMENTS

Conventionally a friction type electromagnetic clutch device is often installed between the output/input end of a rotary kinetic energy source and a load; and through electrically charging or breaking the friction type electromagnetic clutch device to perform operations of combining or releasing, the rotary kinetic energy source and the load are enabled to be engaged or released. One primary disadvantage of the conventional arts is that the friction type electromagnetic clutch device is often remained with residual rotary torque during the releasing, which may cause the kinetic energy loss and the ineffective operation.

Figure 1:
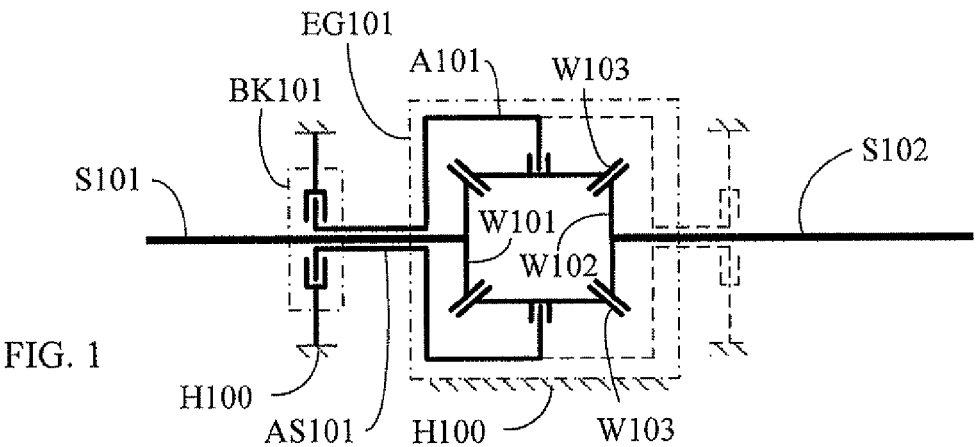
FIG. 1 is a schematic structural view showing the input wheel (W101) and the rotation shaft (S101) of the epicycle gear set (EG101) being served as an output/input end, the output wheel (W102) and the rotation shaft (S102) being served as an output/input end, the rocker arm (A101) and the sleeve type rotation shaft (AS101) linked by the epicycle wheels (W103) being sleeved on the rotation shaft (S101) or the rotation shaft (S102), and the controllable brake device (BK101) being fastened in the housing (H100) through the rocker arm (A101) and the sleeve type rotation shaft (AS101), according to one embodiment of the present invention.

The present invention provides a clutch function device structured with a controllable epicycle gear set, wherein a rotation shaft (S101) combined with an input wheel (W101) of an epicycle gear set (EG101) is served as an output/input end, and a rotation shaft (S102) combined with an output wheel (W102) is served as an output/input end, and a rocker arm (A101) and a sleeve type rotation shaft (AS101) linked by the epicycle wheels (W103) are served as an output/input end, so that a part or all of the three output/input ends are respectively combined to one action side of a corresponding controllable brake device, and the other action side of the controllable brake device is connected to a housing (H100); through controlling the controllable brake device to perform brake locking or releasing, the operations of transmission function of combining transmission or releasing between the rotation shaft (S101) at the output/input end, the rotation shaft (S102) at the output/input end and the sleeve type rotation shaft (AS101) of the epicycle gear set (EG101) are enabled to be controlled;

The structure application of the clutch function device structured with a controllable epicycle gear set of present invention is disclosed as following:

FIG. 1 is a schematic structural view showing the input wheel (W101) and the rotation shaft (S101) of the epicycle gear set (EG101) being served as an output/input end, the output wheel (W102) and the rotation shaft (S102) being served as an output/input end, the epicycle wheels (W103) and the rocker arm (A101) and the sleeve type rotation shaft (AS101) linked by the epicycle wheels (W103) being sleeved on the rotation shaft (S101) or the rotation shaft (S102), and through the rocker arm (A101) or the sleeve type rotation shaft (AS101) connecting to the controllable brake device (BK101) fastened in the housing (H100), according to one embodiment of the present invention.

As show in FIG. 1, which mainly consists of:

Epicycle gear set (EG101): constituted by an input wheel (W101) and an output wheel (W102) and at least an epicycle wheel (W103), and including through the bevel gears engaging with each other, or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward one or both of the rotation shaft (S101) and the rotation shaft (S102), and combined to the sleeve type rotation shaft (AS101) for being sleeved on one or both of the rotation shaft (S101) and the rotation shaft (S102) and capable of rotating thereon;

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the sleeve type rotation shaft (AS101) or the rocker arm (A101), and the other action side is fixed in the housing (H100);

The shell of the epicycle gear set (EG101) is also installed in the housing (H100), and the output wheel (W102) of the epicycle gear set (EG101) is served to drive the rotation shaft (S102);

The clutch function device structured with a controllable epicycle gear set as shown in FIG. 1 is through controlling the controllable brake device (BK101) to perform brake locking or releasing, so as to enable the operation of clutch function between the rotation shaft (S101) and the rotation shaft (S102).

Figure 2:
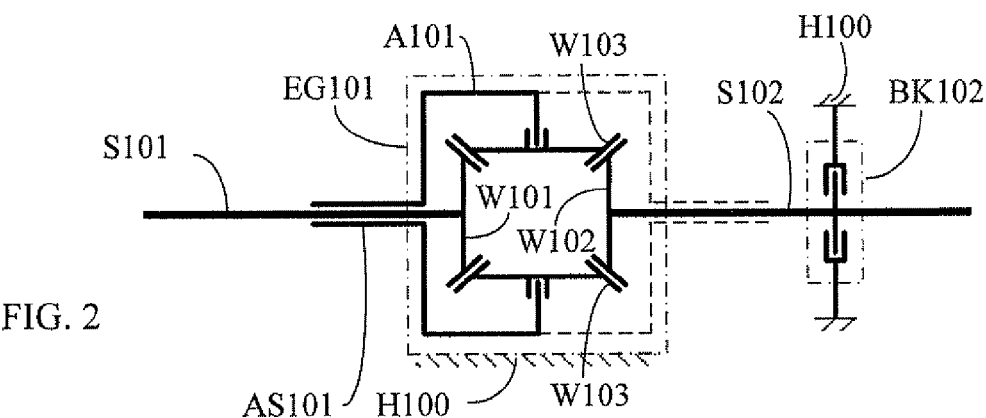
FIG. 2 is a schematic structural view showing the rocker arm (A101) and the sleeve type rotation shaft (AS101) linked by the epicycle wheels (W103) being served as an output/input end, and coaxially sleeved with the rotation shaft (S101) or the rotation shaft (S102), and the controllable brake device (BK102) being combined and fastened in the housing (H100) through the rotation shaft (S102), according to one embodiment of the present invention.

FIG. 2 is a schematic structural view showing the rocker arm (A101) and the sleeve type rotation shaft (AS101) linked by the epicycle wheels (W103) being served as an output/input end, and coaxially sleeved with the rotation shaft (S101) or the rotation shaft (S102), and the controllable brake device (BK102) being combined and fastened in the housing (H100) through the rotation shaft (S102), according to one embodiment of the present invention.

As show in FIG. 2, it mainly consists of:

Epicycle gear set (EG101): constituted by an input wheel (W101) and an output wheel (W102) and at least an epicycle wheel (W103), and including through the bevel gears engaging with each other, or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward one or both of the rotation shaft (S101) and the rotation shaft (S102), and combined to the sleeve type rotation shaft (AS101) for being sleeved on one or both of the rotation shaft (S101) and the rotation shaft (S102) and capable of rotating thereon;

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the rotation shaft (S102), and the other action side is fixed in the housing (H100);

The shell of the epicycle gear set (EG101) is also installed in the housing (H100), and the output wheel (W102) of the epicycle gear set (EG101) is served to drive the rotation shaft (S102);

The clutch function device structured with a controllable epicycle gear set as shown in FIG. 2 is through controlling the controllable brake device (BK102) to perform brake locking or releasing, so as to enable the operation of clutch function between the rotation shaft (S101) and the sleeve type rotation shaft (AS101).

Figure 3:
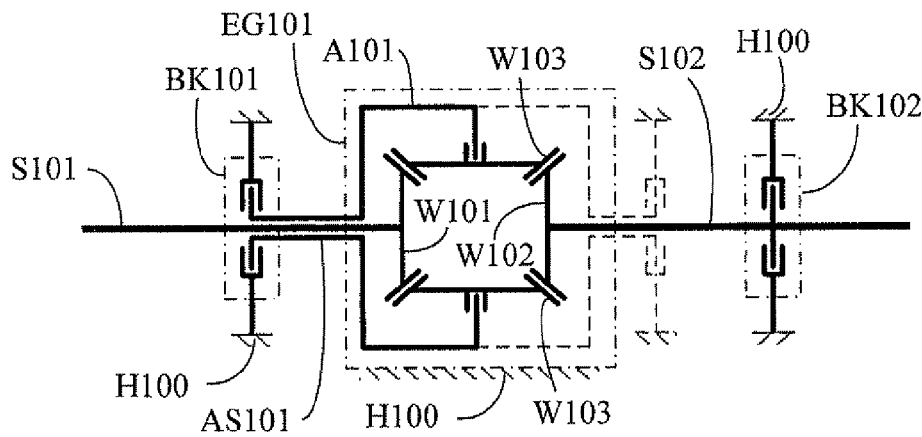
FIG. 3 is a schematic structural view showing the rotation shaft (S102) serving to provide the output function as shown in FIG. 1 being further installed with a controllable brake device (BK102) capable of preventing reverse linkage.

FIG. 3 is a schematic structural view showing the rotation shaft (S102) serving to provide the output function as shown in FIG. 1 being further installed with a controllable brake device (BK102) capable of preventing reverse linkage.

Figure 4:
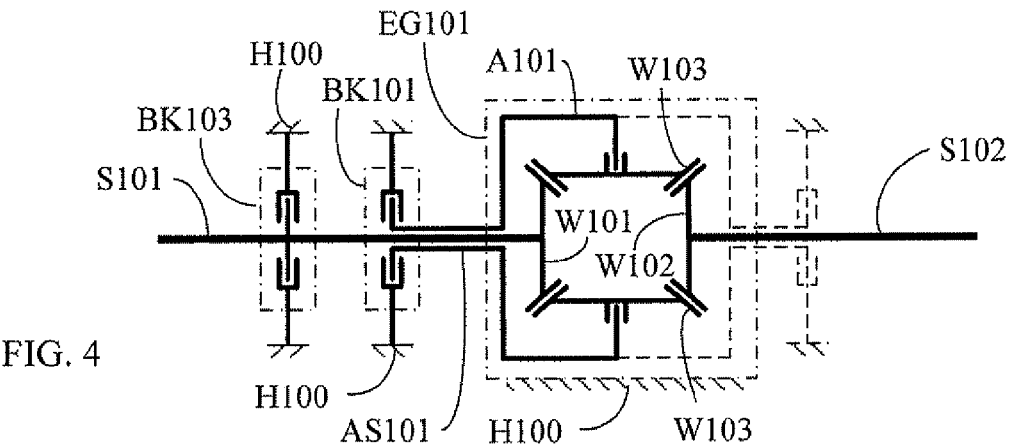
FIG. 4 is a schematic structural view showing the rotation shaft (S101) as shown in FIG. 1 being further installed with a controllable brake device (BK103).

As show in FIG. 3, it mainly consists of:

Epicycle gear set (EG101): constituted by an input wheel (W101) and an output wheel (W102) and at least an epicycle wheel (W103), and including through the bevel gears engaging with each other, or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

- Rocker arm (A101): having one end provided for allowing the epicycle wheel (W103) to rotate and link, and the other end axially extending toward one or both of the rotation shaft (S101) and the rotation shaft (S102), and combined to the sleeve type rotation shaft (AS101) for being sleeved on one or both of the rotation shaft (S101) and the rotation shaft (S102) and capable of rotating thereon;
- Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the sleeve type rotation shaft (AS101) or the rocker arm (A101), and the other action side is fixed in the housing (H100);
- Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the rotation shaft (S102), and the other action side is fixed in the housing (H100);
- The shell of the epicycle gear set (EG101) is also installed in the housing (H100), and the output wheel (W102) of the epicycle gear set (EG101) is served to drive the rotation shaft (S102);

The clutch function device structured with a controllable epicycle gear set as shown in FIG. 3 is through controlling the controllable brake device (BK101) and the controllable brake device (BK102) to generate one or more than one operation functions as following:

1. When the controllable brake device (BK101) is in a brake locking state, and the controllable brake device (BK102) is in a releasing state, the transmission relation between the rotation shaft (S101) and the rotation shaft (S102) is in a connecting relation allowing for transmission;
2. When the controllable brake device (BK101) is in the releasing state, and the controllable brake device (BK102) is in the brake locking state, the transmission relation between the rotation shaft (S101) and the sleeve type rotation shaft (AS101) is in a connecting relation allowing for transmission;
3. When the controllable brake device (BK101) and the controllable brake device (BK102) are both in the brake locking state, the rotation shaft (S101) and the rotation shaft (S102) and the sleeve type rotation shaft (AS101) are all connected in the brake locking state, thus not capable of mutually driving;
4. When the controllable brake device (BK101) and the controllable brake device (BK102) are both in the releasing state, the transmission relation between the rotation shaft (S101) and the rotation shaft (S102) and the sleeve type rotation shaft (AS101) is in a releasing relation allowing idle rotation;

According to the clutch function device structured with a controllable epicycle gear set of present invention, the rotation shaft (S101) can be further installed with a controllable brake device (BK103) for increasing the controllable operation function, the disclosure is as following:

FIG. 4 is a schematic structural view showing the rotation shaft (S101) being further installed with a controllable brake device (BK103) according to the embodiment shown in FIG. 1.

Figure 5:
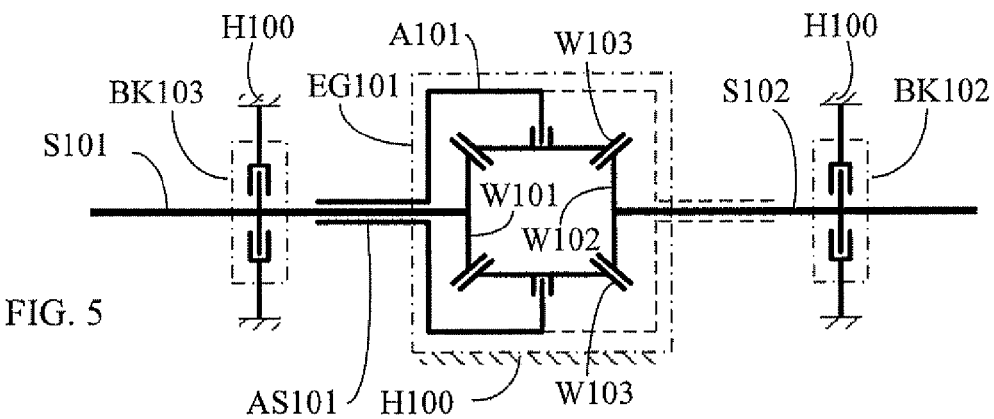
FIG. 5 is a schematic structural view showing the rotation shaft (S101) as shown in FIG. 2 being further installed with a controllable brake device (BK103).

As shown in FIG. 4, the input wheel (W101) and the rotation shaft (S101) of the epicycle gear set (EG101) are served as an output/input end, the output wheel (W102) and the rotation shaft (S102) are served as an output/input end, and the epicycle wheels (W103) and the rocker arm (A101) and the sleeve type rotation shaft (AS101) linked by the epicycle wheels (W103) are sleeved on the rotation shaft (S101) or the rotation shaft (S102), and through the rocker arm (A101) or the sleeve type rotation shaft (AS101) connects to the controllable brake device (BK101) fastened in the housing (H100), and through the rotation shaft (S101) connects to the controllable brake device (BK103) fastened in the housing (H100), and it mainly consists of:

- Epicycle gear set (EG101): constituted by an input wheel (W101) and an output wheel (W102) and at least an epicycle wheel (W103), and including through the bevel gears engaging with each other, or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

- Rocker arm (A101): having one end provided for allowing the epicycle wheel (W103) to rotate and link, and the other end axially extending toward one or both of the rotation shaft (S101) and the rotation shaft (S102), and combined to the sleeve type rotation shaft (AS101) for being sleeved on one or both of the rotation shaft (S101) and the rotation shaft (S102) and capable of rotating thereon;
- Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the sleeve type rotation shaft (AS101) or the rocker arm (A101), and the other action side is fixed in the housing (H100);
- Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the rotation shaft (S101), and the other action side is fixed in the housing (H100);

The shell of the epicycle gear set (EG101) is also installed in the housing (H100), and the output wheel (W102) of the epicycle gear set (EG101) is served to drive the rotation shaft (S102);

The clutch function device structured with a controllable epicycle gear set as shown in FIG. 4 is through controlling the controllable brake device (BK101) and the controllable brake device (BK103) to generate one or more than one operation functions as following:

1. When the controllable brake device (BK101) is in a brake locking state, and the controllable brake device (BK103) is in a releasing state, the transmission relation between the rotation shaft (S101) and the rotation shaft (S102) is in a connecting relation allowing for transmission;
2. When the controllable brake device (BK101) is in the releasing state, and the controllable brake device (BK103) is in the brake locking state, the transmission relation between the rotation shaft (S102) and the sleeve type rotation shaft (AS101) is in a connecting relation allowing for transmission;
3. When the controllable brake device (BK101) and the controllable brake device (BK103) are both in the brake locking state, the rotation shaft (S101) and the rotation shaft (S102) and the sleeve type rotation shaft (AS101) are all connected in the brake locking state, thus not capable of mutually driving;
4. When the controllable brake device (BK101) and the controllable brake device (BK103) are both in the releasing state, the transmission relation between the rotation shaft (S101) and the rotation shaft (S102) and the sleeve type rotation shaft (AS101) is in a releasing relation allowing idle rotation;

FIG. 5 is a schematic structural view showing the rotation shaft (S101) being further installed with a controllable brake device (BK103) according to the embodiment shown in FIG. 2

As shown in FIG. 5, the input wheel (W101) and the rotation shaft (S101) of the epicycle gear set (EG101) are served as an output/input end, the output wheel (W102) and the rotation shaft (S102) are served as an output/input end, and the epicycle wheels (W103) and the rocker arm (A101) and the sleeve type rotation shaft (AS101) linked by the epicycle wheels (W103) are sleeved on the rotation shaft (S101) or the rotation shaft (S102), and through the rotation shaft (S102) connects to the controllable brake device (BK102) fastened in the housing (H100), and through the rotation shaft (S101) connects to the controllable brake device (BK103) fastened in the housing (H100), which mainly consists of:

Epicycle gear set (EG101): constituted by an input wheel (W101) and an output wheel (W102) and at least an epicycle wheel (W103), and including through the bevel gears engaging with each other, or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward one or both of the rotation shaft (S101) and the rotation shaft (S102), and combined to the sleeve type rotation shaft (AS101) for being sleeved on one or both of the rotation shaft (S101) and the rotation shaft (S102) and capable of rotating thereon;

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the rotation shaft (S102), and the other action side is fixed in the housing (H100);

Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the rotation shaft (S101), and the other action side is fixed in the housing (H100);

The shell of the epicycle gear set (EG101) is also installed in the housing (H100), and the output wheel (W102) of the epicycle gear set (EG101) is served to drive the rotation shaft (S102);

The clutch function device structured with a controllable epicycle gear set as shown in FIG. 5 is through controlling the controllable brake device (BK102) and the controllable brake device (BK103) to generate one or more than one operation functions as following:

1. When the controllable brake device (BK103) is in a brake locking state, and the controllable brake device (BK102) is in a releasing state, the transmission relation between the sleeve type rotation shaft (AS101) and the rotation shaft (S102) is in a connecting relation allowing for transmission;
2. When the controllable brake device (BK103) is in the releasing state, and the controllable brake device (BK102) is in the brake locking state, the transmission relation between the rotation shaft (S101) and the sleeve type rotation shaft (AS101) is in a connecting relation allowing for transmission;
3. When the controllable brake device (BK101) and the controllable brake device (BK102) are both in the brake locking state, the rotation shaft (S101) and the rotation shaft (S102) and the sleeve type rotation shaft (AS101) are all connected in the brake locking state, thus not capable of mutually driving;
4. When the controllable brake device (BK101) and the controllable brake device (BK102) are both in the releasing state, the transmission relation between the rotation shaft (S101) and the rotation shaft (S102) and the sleeve type rotation shaft (AS101) is in a releasing relation allowing for idle rotation;

According to the clutch function device structured with a controllable epicycle gear set of the present invention, the sleeve type rotation shaft (AS101) is installed with the controllable brake device (BK101) and the rotation shaft (S102) is installed with the controllable brake device (BK102), and the rotation shaft (S101) can be further installed with a controllable brake device (BK103) for increasing the controllable operation function.

Figure 6:
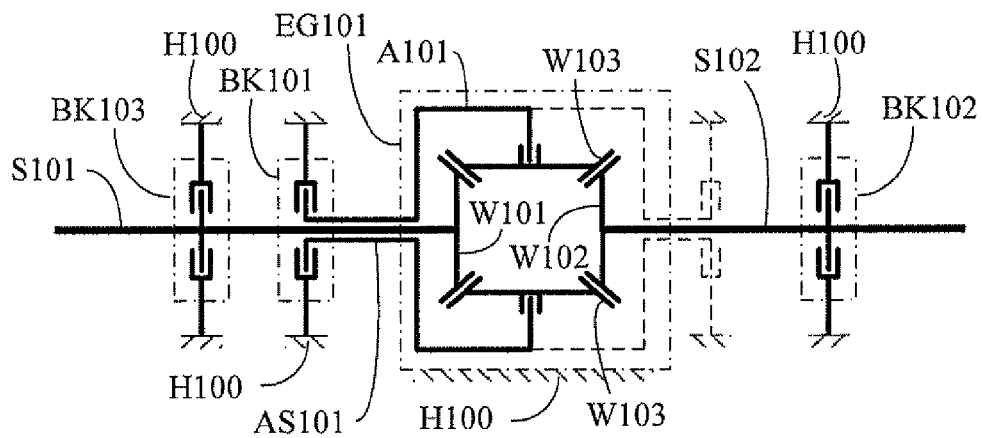
FIG. 6 is a schematic structural view showing the rotation shaft (S101) as shown in FIG. 3 being further installed with a controllable brake device (BK103).

FIG. 6 is a schematic structural view showing the rotation shaft (S101) being further installed with a controllable brake device (BK103) according to the embodiment shown in FIG. 3.

As shown in FIG. 6, the input wheel (W101) and the rotation shaft (S101) of the epicycle gear set (EG101) are served as an output/input end, the output wheel (W102) and the rotation shaft (S102) are served as an output/input end, and the epicycle wheels (W103) and the rocker arm (A101) and the sleeve type rotation shaft (AS101) linked by the epicycle wheels (W103) are sleeved on the rotation shaft (S101) or the rotation shaft (S102), and through the rocker arm (A101) or the sleeve type rotation shaft (AS101) connects to the controllable brake device (BK101) fastened in the housing (H100), and through the rotation shaft (S102) connects to the controllable brake device (BK102) fastened in the housing (H100), and through the rotation shaft (S101) connects to the controllable brake device (BK103) fastened in the housing (H100), which mainly consists of:

Epicycle gear set (EG101): constituted by an input wheel (W101) and an output wheel (W102) and at least an epicycle wheel (W103), and including through the bevel gears engaging with each other, or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward one or both of the rotation shaft (S101) and the rotation shaft (S102), and combined to the sleeve type rotation shaft (AS101) for being sleeved on one or both of the rotation shaft (S101) and the rotation shaft (S102) and capable of rotating thereon;

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the sleeve type rotation shaft (AS101) or the rocker arm (A101), and the other action side is fixed in the housing (H100);

The shell of the epicycle gear set (EG101) is also installed in the housing (H100), and the output wheel (W102) of the epicycle gear set (EG101) is served to drive the rotation shaft (S102);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the rotation shaft (S102), and the other action side is fixed in the housing (H100);

Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is combined with the rotation shaft (S101), and the other action side is fixed in the housing (H100);

The clutch function device structured with a controllable epicycle gear set as shown in FIG. 6 is through controlling the controllable brake device (BK101), the controllable brake device (BK102) and the controllable brake device (BK103) to generate one or more than one operation functions as following:

1. When the controllable brake device (BK101) is in a brake locking state, and the controllable brake device (BK102) and the controllable brake device (BK103) are in a releasing state, the transmission relation between the rotation shaft (S101) and the rotation shaft (S102) is in a connecting relation allowing for transmission;
2. When the controllable brake device (BK101) and the controllable brake device (BK103) are in the releasing state, and the controllable brake device (BK102) is in the brake locking state, the transmission relation between the rotation shaft (S101) and the sleeve type rotation shaft (AS101) is in a connecting relation allowing for transmission;
3. When the controllable brake device (BK103) is in the brake locking state, the controllable brake device (BK101) and the controllable brake device (BK102) are in the releasing state, the transmission relation between the sleeve type rotation shaft (AS101) and the rotation shaft (S102) is in a connecting relation allowing for transmission;
4. When two or more than two of the controllable brake device (BK101) and the controllable brake device (BK102) and the controllable brake device (BK103) are in the brake locking state, the rotation shaft (S101) and the rotation shaft (S102) and the sleeve type rotation shaft (AS101) are all connected in the brake locking state, thus not capable of mutually driving;
5. When the controllable brake device (BK101) and the controllable brake device (BK102) and the controllable brake device (BK103) are all in the releasing state, the transmission relation between the rotation shaft (S101) and the rotation shaft (S102) and the sleeve type rotation shaft (AS101) is a releasing relation allowing for idle rotation.

The invention claimed is:
1. A clutch device, comprising:
a housing (H100);
an epicyclic gear set (EG101) installed within the housing (H100), wherein:
said epicyclic gear set includes an input wheel (W101), and output wheel (W102), and an epicyclic wheel (W103) that rotatably engages the input wheel (W101) and the output wheel (W102),
said input wheel (W101), output wheel (W102), and epicyclic wheel (W103) each includes one of a bevel gear and a bevel friction wheel, and
said input wheel (W101) is mounted on a first rotation shaft (S101), said output wheel (W102) is mounted on a second rotation shaft (S102) coaxial with the first rotation shaft (S101), and said epicyclic wheel is mounted on a rocker arm (A101) having a sleeve-shaped rotation shaft (AS101) that coaxially sur- rounds and is rotatable relative to at least one of said first rotation shaft (S101) and said second rotation shaft (S102); and at least one controllable brake device (BK101, BK102, or BK103) having one side fixed to the housing; (H100) and an action side that is fixed to one of the sleeve-shaped rotation shaft (AS101) or rocker arm (A101), the first rotation shaft (S101), and the second rotation shaft (S102) for controlling operation of the clutch device by locking or releasing said one of the sleeve-shaped rotation shaft (AS101), first rotation shaft (S101), and second rotation shaft (S102).

2. A clutch device as claimed in claim 1, wherein a speed ratio between the input wheel (W101) and the output wheel (W102) is 1:1, and respective speed ratios of the input wheel (W101) and output wheel (W102) to the epicyclic wheel (W103) are the same or different.

3. A clutch device as claimed in claim 1, wherein a speed ratio between the input wheel (W101) and the output wheel (W102) is different than 1:1, and respective speed ratios of the input wheel (W101) and the output wheel (W102) to the epicyclic wheel (W103) are the same or different.

4. A clutch device as claimed in claim 1, wherein said at least one controllable brake device (BK101,BK102,BK103) is controllable by at least one of a manual force, a mechanical force, a hydraulic force, a pneumatic force, and an electromagnetic force.

5. A clutch device as claimed in claim 1, wherein said action side of the at least one controllable brake device (BK101) is arranged to lock and release the sleeve-shaped rotation shaft (AS101) or rocker arm (A101) such that:

when the controllable brake device (BK101) is engaged with said sleeve-shaped rotation shaft (AS101) and rocker arm (A101) a transmission state is provided between the first rotational shaft (S101) and the second rotation shaft (S102), and when the controllable brake device (BK101) releases said sleeve-shaped rotation shaft (AS101) or rocker arm (A101), epicyclic motion of the epicyclic wheel (W103) prevents transmission of rotational energy between the first and second rotation shafts (S101,S102), thereby providing a clutch function between said first and second rotation shafts (S101,S102).

6. A clutch device as claimed in claim 1, wherein said rocker arm (A101) and sleeve-shaped rotation shaft (AS101) serve as an input/output to said epicyclic gear set (EG101) and said action side of the at least one controllable brake device (BK102) is arranged to lock and release the second rotation shaft (S 102) such that when the controllable brake device (BK102) is locked, said sleeve-shaped rotation shaft (AS 101) transmits, through epicyclic motion of said rocker arm (A101), said epicyclic wheel (W103), and said input wheel (W101), rotational energy between the sleeve-shaped rotation shaft (AS101) and the first rotation shaft (S101), thereby providing a clutch function between said sleeve-shaped rotation shaft (AS 101) and said first rotation shaft (S101).

7. A clutch device as claimed in claim 1, wherein said at least one controllable brake device includes a first controllable brake device (BK101) engaged with the sleeve-shaped rotation shaft (AS101) or rocker arm (A101) in a locking state and disengaged from the sleeve-shaped rotation shaft (AS101) or rocker arm (A101) in a releasing state, and wherein at least one controllable brake device further includes a second controllable brake device (BK102) that, when in a locking state, locks the second rotation shaft (S102) at the same time, and that is disengaged from the second rotation shaft (S102) in a releasing state.

8. A clutch device as claimed in claim 7, wherein said first controllable brake device (BK101) and said second controllable brake device (BK102) control the following functions of the clutch device:

(i) when the first controllable brake device (BK101) is in the locking state and the second controllable brake device (BK102) is in the releasing state, the first and second rotation shafts (S101,S102) are in a connected relationship for transmission of rotational kinetic energy between the first and second rotation shafts (S101, S102);

(ii) when the first controllable brake device (BK101) is in the releasing state and the second controllable brake device (BK102) is in the locking state, the sleeve-shaped rotation shaft (AS 101) and the first rotation shaft (S101) are in a connected relationship for transmission of rotational kinetic energy between the sleeve-shaped rotation shaft (AS101) and the first rotation shaft (S101);

(iii) when the first controllable brake device (BK101) and the second controllable brake device (BK102) are both in a locking state, the sleeve-shaped rotation shaft (AS101) and the first and second rotation shafts (S101, S102) are all locked; and (iv) when the first controllable brake device (BK101) and the second controllable brake device (BK102) are both in a releasing state, the sleeve-shaped rotation shaft (AS101) and the first and second rotation shafts (S101, S102) are all in a released relationship and free to idle.

9. A clutch device as claimed in claim 1, wherein said at least one controllable brake device includes a first controllable brake device (BK101) engaged with the sleeve-shaped rotation shaft (AS101) or rocker arm (A101) in a locking state and disengaged from the sleeve-shaped rotation shaft (AS101) or rocker arm (A101) in a releasing state, a second controllable brake device (BK103) engaged with the first rotation shaft (S101) in a locking state and disengaged from the second rotation shaft (S 101) in a releasing state.

10. A clutch device as claimed in claim 9, wherein said first controllable brake device (BK101) and said second controllable brake device (BK103) control the following functions of the clutch device:

(i) when the first controllable brake device (BK101) is in the locking state and the second controllable brake device (BK103) is in the releasing state, the first and second rotation shafts (S101,S102) are in a connected relationship for transmission of rotational kinetic energy between the first and second rotation shafts (S101, S102);

(ii) when the first controllable brake device (BK101) is in the releasing state and the second controllable brake device (BK103) is in the locking state, the sleeve-shaped rotation shaft (AS101) and the second rotation shaft (S102) are in a connected relationship for transmission of rotational kinetic energy between the sleeve-shaped rotation shaft (AS101) and the second rotation shaft (S102);

(iii) when the first controllable brake device (BK101) and the second controllable brake device (BK103) are both in a locking state, the sleeve-shaped rotation shaft (AS101) and the first and second rotation shafts (S101, S102) are all locked; and (iv) when the first controllable brake device (BK101) and the second controllable brake device (BK103) are both in a releasing state, the sleeve-shaped rotation shaft (AS101) and the first and second rotation shafts (S101, S102) are all in a released relationship and free to idle.

11. A clutch device as claimed in claim 1, wherein said at least one controllable brake device includes a first controllable brake device (BK102) engaged with the second rotation shaft (S102) in a locking state and disengaged from the first rotation shaft (S102) in a releasing state, a second controllable brake device (BK103) engaged with the first rotation shaft (S101) in a locking state and disengaged from the second rotation shaft (S101) in a releasing state.

12. A clutch device as claimed in claim 11, wherein said first controllable brake device (BK102) and said second controllable brake device (BK103) control the following functions of the clutch device:
   (i) when the second controllable brake device (BK103) is in the locking state and the first controllable brake device (BK102) is in the releasing state, the sleeve-shaped rotation shaft (AS 101) and second rotation shaft (S102) are in a connected relationship for transmission of rotational kinetic energy between the sleeve-shaped rotation shaft (AS101) and the second rotation shaft (S102);
   (ii) when the second controllable brake device (BK103) is in the releasing state and the first controllable brake device (BK102) is in the locking state, the sleeve-shaped rotation shaft (AS101) and the first rotation shaft (S101) are in a connected relationship for transmission of rotational kinetic energy between the sleeve-shaped rotation shaft (AS101) and the first rotation shaft (S101);
   (iii) when the first controllable brake device (BK102) and the second controllable brake device (BK103) are both in a locking state, the sleeve-shaped rotation shaft (AS101) and the first and second rotation shafts (S101, S102) are all locked; and
   (iv) when the first controllable brake device (BK102) and the second controllable brake device (BK103) are both in a releasing state, the sleeve-shaped rotation shaft (AS101) and the first and second rotation shafts (S101, S102) are all in a released relationship and free to idle.

13. A clutch device as claimed in claim 1, wherein said at least one controllable brake device includes a first controllable brake device (BK101) engaged with the sleeve-shaped rotation shaft (AS101) or rocker arm (A101) in a locking state and disengaged from the sleeve-shaped rotation shaft (AS101) or rocker arm (A101) in a releasing state, a second controllable brake device (BK102) engaged with the second rotation shaft (S102) in a locking state and disengaged from the second rotation shaft (S 102) in a releasing state, and a third controllable brake device (BK103) engaged with the first rotation shaft (S101) in a locking state and disengaged from the first rotation shaft (S101) in a releasing state.

14. A clutch device as claimed in claim 13, wherein said first controllable brake device (BK101), said second controllable brake device (BK102), and said third controllable brake device (BK103) control the following functions of the clutch device:
   (i) when the first controllable brake device (BK101) is in the locking state and the second and third controllable brake devices (BK102,BK103) are in the releasing state, the first and second rotation shafts (S101,S102) are in a connected relationship for transmission of rotational kinetic energy between the first and second rotation shafts (S101,S102);
   (ii) when the first controllable brake device (BK101) and the third controllable brake device (BK103) are in the releasing state and the second controllable brake device (BK102) is in the locking state, the sleeve-shaped rotation shaft (AS101) and the first rotation shaft (S101) are in a connected relationship for transmission of rotational kinetic energy between the sleeve-shaped rotation shaft (AS101) and the first rotation shaft (S101);
   (iii) when the first controllable brake device (BK101) and the second controllable brake device (BK102) are in the releasing state and the third controllable brake device (BK103) is in the locking state, the sleeve-shaped rotation shaft (AS101) and the second rotation shaft (S102) are in a connected relationship for transmission of rotational kinetic energy between the sleeve-shaped rotation shaft (AS101) and the first rotation shaft (S102);
   (iv) when at least two of the first controllable brake device (BK101), the second controllable brake device (BK102), and the third controllable brake device (BK103) are in a locking state, the sleeve-shaped rotation shaft (AS101) and the first and second rotation shafts (S101,S102) are all locked; and
   (v) when the first controllable brake device (BK101), the second controllable brake device (BK102), and the third controllable brake device (BK103) are all in a releasing state, the sleeve-shaped rotation shaft (AS101) and the first and second rotation shafts (S101,S102) are all in a released relationship and free to idle.

* * * * *